(12) United States Patent
Huang et al.

(10) Patent No.: US 12,292,585 B2
(45) Date of Patent: May 6, 2025

(54) APERTURE ASSEMBLY

(71) Applicants: SINTAI OPTICAL (SHENZHEN) CO., LTD., Guangdong (CN); ASIA OPTICAL CO., INC., Taichung (TW)

(72) Inventors: Chun-Hung Huang, Taichung (TW); Tsung-tse Chen, Taichung (TW)

(73) Assignees: SINTAI OPTICAL (SHENZHEN) CO., LTD., Guangdong (CN); ASIA OPTICAL CO., INC., Taichung (TW)

( * ) Notice: Subject to any disclaimer, the term of this patent is extended or adjusted under 35 U.S.C. 154(b) by 773 days.

(21) Appl. No.: 17/509,003

(22) Filed: Oct. 24, 2021

(65) Prior Publication Data

US 2022/0146717 A1 May 12, 2022

(30) Foreign Application Priority Data

Nov. 12, 2020 (CN) .......................... 202011260160.1

(51) Int. Cl.
G02B 5/00 (2006.01)

(52) U.S. Cl.
CPC .................................. G02B 5/005 (2013.01)

(58) Field of Classification Search
CPC ........ G02B 5/005; G02B 26/023; G03B 9/02; G03B 30/00; G03B 9/24
See application file for complete search history.

(56) References Cited

U.S. PATENT DOCUMENTS

| | | | |
|---|---|---|---|
| 3,772,974 A | 11/1973 | Shimomura | |
| 8,142,085 B2 | 3/2012 | Hasegawa | |
| 9,004,786 B2 | 4/2015 | Muramatsu | |
| 10,436,954 B2 | 10/2019 | Shih et al. | |
| 2004/0239797 A1 | 12/2004 | Masuda | |
| 2010/0272429 A1 | 10/2010 | Koo | |
| 2010/0277784 A1* | 11/2010 | Hsueh | G02B 5/005 |
| | | | 359/230 |
| 2011/0091198 A1* | 4/2011 | Hasegawa | G03B 9/02 |
| | | | 396/505 |
| 2018/0210314 A1* | 7/2018 | Martin | G03B 9/02 |

FOREIGN PATENT DOCUMENTS

| | | |
|---|---|---|
| CN | 104035263 A | 9/2014 |
| CN | 205643983 U | 10/2016 |
| CN | 207181797 U | 4/2018 |
| JP | 2014119582 A | 6/2014 |
| KR | 20180123776 A | 11/2018 |
| TW | 533332 B | 5/2003 |
| TW | 1232999 B | 5/2005 |

(Continued)

*Primary Examiner* — Joseph P Martinez
*Assistant Examiner* — Ray Alexander Dean
(74) *Attorney, Agent, or Firm* — Rivka Friedman

(57) ABSTRACT

The present application provides an aperture assembly. The aperture assembly is used in an optical lens system. The aperture assembly includes a plate including a hollow portion and a non-hollow portion. The hollow portion is configured to define an aperture of the optical lens system, wherein the contour of the hollow portion has a non-circular shape. The aperture assembly can prevent the size of the aperture from being reduced as the size of the plate is reduced in a case that a circular aperture is applied to the plate. The present application also realizes an aperture adjustment for a non-circular aperture.

19 Claims, 6 Drawing Sheets

(56) References Cited

FOREIGN PATENT DOCUMENTS

| TW | 200734808 | A | 9/2007 |
| TW | 200823596 | A | 6/2008 |
| TW | 201022835 | A | 6/2010 |
| TW | I417641 | B | 12/2013 |
| TW | 200523663 | A | 7/2015 |

\* cited by examiner

APERTURE ASSEMBLY

CROSS REFERENCE TO RELATED APPLICATION

This application claims priority to China Patent Application No. 202011260160.1, filed on Nov. 12, 2020, which is incorporated herein by reference in its entirety.

TECHNICAL FIELD

The present application relates to optical technologies, and more particularly to an aperture assembly.

BACKGROUND

Nowadays, electronic devices (e.g., cell phones and tablet computers) are developed towards a trend of lightweight and miniaturization, and their equipped image capturing devices (e.g., camera lenses) also needs to make a size adjustment accordingly. In response to this size adjustment, the aperture size, the size and the thickness of the camera lenses also need to be reduced. This makes the camera lenses with a large size of aperture difficult to be applied to lightweight electronic devices.

As the size of the camera lenses is reduced, components inside the camera lens also have to be adjusted in size accordingly. In particular, as shown in FIG. 1, a size reduction on a plate 12 used to define a circular aperture will also make the size of the aperture be affected, reducing from an aperture size A with large area to an aperture size B with small area. This cannot satisfy the demands on large aperture size and also makes the camera design be restricted. Therefore, developing lightweight electronic devices equipped with camera lenses having a large aperture size is a technical problem in this field.

In addition, on the promise of requirements on thin electronic devices, it is a challenge to deploy an aperture adjusting structure on the device body. However, an ability to adjust the aperture size can change depth of the field and improve the quality of captured photos. It is a quite practical function. Therefore, how to realize an adjustable aperture on an electronic device equipped with a camera lens is a direction that efforts can be put on in this field.

SUMMARY

An objective of the present application is to provide an aperture assembly, for preventing an aperture size from being reduced as the size of a plate is reduced in a case that a circular aperture is applied to the plate.

An objective of the present application is to provide an aperture assembly, for realizing an aperture adjustment for a non-circular aperture, characterized in having a large size of aperture and an adjustable aperture under a design of thin and micro articles.

To achieve above objects, the present application provides an aperture assembly used in an optical lens system. The aperture assembly includes a plate, including a hollow portion and a non-hollow portion, wherein the hollow portion is configured to define an aperture of the optical lens system, and a contour of the hollow portion has a non-circular shape; and a first aperture sheet and a second aperture sheet, disposed on the plate, wherein when the first aperture sheet moves along a first direction and the second aperture sheet moves along a second direction, the aperture of the optical lens system is changed such that the optical lens system has a first aperture; when the first aperture sheet moves along the second direction and the second aperture sheet moves along the first direction, the aperture of the optical lens system is changed such that the optical lens system has a second aperture, and wherein the first aperture is different from the second aperture.

In the aperture assembly of the present application, the contour of the hollow portion includes a first cut edge and a first curved edge connected to the first cut edge, and a second cut edge and a second curved edge connected to the second cut edge, and wherein the second cut edge is disposed opposite to the first cut edge and the second curved edge is disposed opposite to the first curved edge.

In the aperture assembly of the present application, the first cut edge and the second cut edge have an approximately same length and the first curved edge and the second curved edge have a same radius of curvature.

In the aperture assembly of the present application, the first direction and the second direction are inclined with respect to, parallel to or perpendicular to the direction of the first cut edge or the second cut edge.

In the aperture assembly of the present application, the aperture assembly further includes: a rotating member, provided with a first force applying member and a second force applying member, wherein the first aperture sheet is provided with a first force receiving member, the first force applying member of the rotating member is adaptive to the first force receiving member, and the first force applying member applies a force to the first aperture sheet as the rotating member rotates such that the first aperture sheet moves, and wherein the second aperture sheet is provided with a second force receiving member, the second force applying member of the rotating member is adaptive to the second force receiving member, and the second force applying member applies a force to the second aperture sheet as the rotating member rotates such that the second aperture sheet moves In the aperture assembly of the present application, the aperture assembly further includes: a base, provided with a position limiting member, wherein the first aperture sheet has a first position limiting structure, the second aperture sheet has a second position limiting structure, the position limiting member of the base is adaptive to the first position limiting structure and the second position limiting structure and is configured to guide the movement of the first aperture sheet and the second aperture sheet.

In the aperture assembly of the present application, the first force applying member and the second force applying member of the rotating member are located at radial opposite positions, and the first position limiting structure of the first aperture sheet and the second position limiting structure of the second aperture sheet extend along the first direction and the second direction.

In the aperture assembly of the present application, the plate is provided with a first position limiting slot and a second position limiting slot, the first force applying member of the rotating member penetrates the first position limiting slot on the plate, and the second force applying member of the rotating member penetrates the second position limiting slot on the plate, and wherein the first position limiting slot is configured to limit the movement of the first force applying member of the rotating member; the second position limiting slot is configured to limit the movement of the second force applying member of the rotating member.

In the aperture assembly of the present application, the first position limiting slot is shaped as an arc and corresponds to a motion track of the first force applying member, and the second position limiting slot is shaped as an arc and corresponds to a motion track of the second force applying member.

In the aperture assembly of the present application, first force applying member and the second force applying member of the rotating member are a first protrusion and a second protrusion, respectively, the first force receiving member on the first aperture sheet and the second force receiving member on the second aperture sheet are a first force receiving hole and a second force receiving hole, respectively, the first protrusion of the rotating member penetrates the first force receiving hole of the first aperture sheet, and the second protrusion of the rotating member penetrates the second force receiving hole of the second aperture sheet.

In the aperture assembly of the present application, the position limiting member on the base is a position limiting protrusion, the first position limiting structure of the first aperture sheet and the second position limiting structure of the second aperture sheet are a first position limiting hole and a second position limiting hole, respectively, and the position limiting protrusion penetrates the first position limiting hole of the first aperture sheet and the second position limiting hole of the second aperture sheet, and wherein the first aperture sheet and the second aperture sheet are aperture blades that sequentially overlap on the plate.

In the aperture assembly of the present application, the first force receiving member of the first aperture sheet and the second force receiving member of the second aperture sheet are a first force receiving hole and a second force receiving hole, respectively, the first aperture sheet is provided with a first pass allowing hole, the second aperture sheet is provided with a second pass allowing hole, the first force applying member of the rotating member penetrates the first force receiving hole of the first aperture sheet and the second pass allowing hole of the second aperture sheet, the second force applying member of the rotating member penetrates the first pass allowing hole of the first aperture sheet and the second force receiving hole of the second aperture sheet.

In the aperture assembly of the present application, the first pass allowing hole is configured for the second force applying member of the rotating member not to interfere with the first aperture sheet when applying a force to the second aperture sheet, and the second pass allowing hole is configured for the first force applying member of the rotating member not to interfere with the second aperture sheet when applying a force to the first aperture sheet.

In the aperture assembly of the present application, the aperture assembly further includes a third aperture sheet and a fourth aperture sheet, overlapping with the plate, the first aperture sheet and the second aperture sheet, wherein the third aperture sheet and the fourth aperture sheet are allowed to move along a third direction and a fourth direction, respectively, and the third aperture sheet and the fourth aperture sheet are also allowed to move along the fourth direction and the third direction, respectively.

In the aperture assembly of the present application, the aperture assembly further includes: a rotating member, provided with a first force applying member, a second force applying member, a third force applying member and a fourth force applying member, wherein the first aperture sheet is provided with a first force receiving member, the first force applying member of the rotating member is adaptive to the first force receiving member, and the first force applying member drives the first aperture sheet to move along the first direction; wherein the second aperture sheet is provided with a second force receiving member, the second force applying member of the rotating member is adaptive to the second force receiving member, and the second force applying member drives the second aperture sheet to move along the second direction; the third aperture sheet is provided with a third force receiving member, the third force applying member of the rotating member is adaptive to the third force receiving member, and the third force applying member drives the third aperture sheet to move along the third direction; the fourth aperture sheet is provided with a fourth force receiving member, the fourth force applying member of the rotating member is adaptive to the fourth force receiving member, and the fourth force applying member drives the fourth aperture sheet to move along the fourth direction.

In the aperture assembly of the present application, the first direction and the second direction corresponds to vertical directions and the third direction and the fourth direction corresponds to horizontal directions.

In the aperture assembly of the present application, the aperture assembly further includes a driving unit, which is a motor having a rotatable axial rod, wherein the rotating member is fastened to the axial rod of the motor and rotates as the axial rod rotates.

In the aperture assembly of the present application, the aperture assembly further includes a driving unit, including a drive base, an axial rod, a magnet and a coil, wherein the magnet is disposed opposite to the coil, the axial rod is disposed on the drive base, and the rotating member is connected to the axial rod.

In the aperture assembly of the present application, the hollow portion of the plate used to define the aperture of the optical lens system has a non-circular contour, and the non-circular contour is constructed by a plurality of successive concave and convex figures, saws or waves.

In the aperture assembly of the present application, the non-circular contour has the plurality of concave and convex figures, saws or waves but the whole contour is still a non-circular contour.

In the aperture assembly of the present application, the hollow portion of the plate used to define the aperture of the optical lens system has a non-circular contour, and therefore it can prevent the aperture size from being reduced as the size of the plate is reduced in a case that a circular aperture is applied to the plate. The present application can realize a deployment of an image capturing module with a large size of aperture for a thin or small-sized electronic device, thereby realizing photographing with a large aperture. Furthermore, in an embodiment of the present application, a pair of aperture sheets are utilized. One aperture sheet moves along a first direction and the other one aperture sheet moves along a second direction. By this way, the aperture size is changed, and aperture size adjustment for a non-circular aperture is realized. Moreover, a plurality of pairs of aperture sheets can be combined. Each pair of aperture sheets move along a different direction. Multiple-stage aperture adjustment is realized such that the optical lens system has a multiple-stage adjustable aperture.

DETAILED DESCRIPTION

To make the objectives, technical schemes, and effects of the present application more clear and specific, the present application is described in further detail below with reference to embodiments in accompanying with the drawings. It should be understood that the specific embodiments described herein are merely for explaining the present application, the term "embodiment" used in the context means an example, instance or illustration, and the present application is not limited thereto. In addition, the articles "a" and "an" as used in this application and the appended claims may generally be construed to mean "one or more" unless specified otherwise or clear from context to be directed to a singular form. Additionally, in the appended figures, elements with similar or the same structures or functions are indicated by same reference numbers.

The present application provides an aperture assembly, which can be installed in, but not limited to, a mobile terminal such as a cell phone, a smartphone and a tablet computer, a wearable device equipped with a camera function, and etc. The present application can realize a deployment of an image capturing module with a large size of aperture for a lightweight and thin electronic device, and satisfy user demands on photographing using large aperture (i.e. small value of F-Number). In another aspect, the present application can give a camera equipped in the electronic device a changeable aperture such that an adjustment of depth of field in photography can be realized by selecting an aperture size when a user takes a picture using the camera.

The aperture assembly provided in the present application is used in an optical lens system, serving as a part of an image capturing module or a camera lens. The aperture assembly is configured to define the aperture of the camera lens, that is, to control an amount of light passing through the camera lens. The aperture assembly can be implemented by an aperture assembly making the camera lens have a fixed aperture size or an aperture assembly making the camera lens have an adjustable aperture size.

Figure 1:
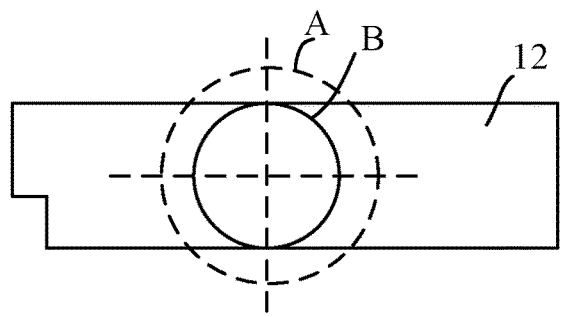
FIG. 1 is a schematic diagram illustrating a conventional aperture deployment.
Figure 2:
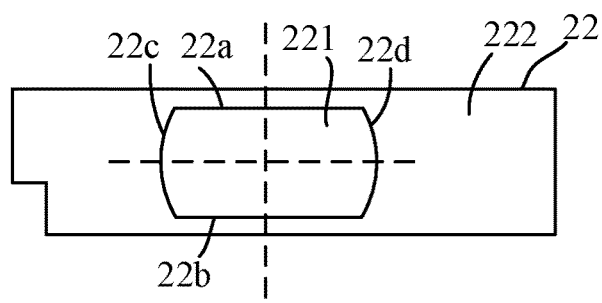
FIG. 2 is a schematic diagram illustrating an aperture deployment in accordance with an embodiment of the present application.

As shown in FIG. 2, the aperture assembly includes a plate 22, which includes a hollow portion 221 and a non-hollow portion 222. The hollow portion 221 is configured to define the aperture of the optical lens system. The plate 22 recited in the context can be one plate or one of a plurality of plates in the aperture assembly and can also be a general name of a plurality of plates with hollow portions having similar or the same size or shape in the aperture assembly. The hollow portion 221 of the plate 22 represents an area allowing light rays to pass through, which can be an aperture at a certain cross-section on a path of the light rays propagating in the camera and can also be an initial or final aperture of the optical lens system.

Specifically speaking, different from the aperture of a conventional camera, the contour of the hollow portion 221 of the plate 22 in the present application has a non-circular shape, that is, a non-circular aperture is formed. The inner and the outer contour of the plate 22 has a non-circular shape too. In an embodiment, as shown in FIG. 2, the contour of the hollow portion 221 includes a first cut edge 22a, a second cut edge 22b, a first curved edge 22c and a second curved edge 22d. The first cut edge 22a and the second cut edge 22b are disposed opposite to each other and the first curved edge 22c and the second curved edge 22d are disposed opposite to each other. A cut edge is a straight edge that may be formed when a portion of a geometric shape (e.g.,) is cut away along a straight line, in other words, a cut edge is formed by cutting out upper or lower portion of a circle. A curved edge has a corresponding curved line, in other words, a curved edge is formed by portion of a circle. The cut edges 22a and 22b and the curved edges 22c and 22d are connected to each other end by end so as to form a hollow or empty area, that is, the hollow portion 221. In an embodiment, the first cut edge 22a and the second cut edge 22b have an approximately same length and the first curved edge 22c and the second curved edge 22d have a same radius of curvature, that is, the plate 22 defines a symmetric hollow portion 221. The foregoing "approximately same" length means the difference between the length of the first cut edge 22a and the second cut edge 22b is less than or equal to 5% of the length of the first cut edge 22a, the second cut edge 22b, or an average of the length of the first cut edge 22a and the second cut edge 22b.

On approach that can be considered is that under the situation of a need to reduce the size of the plate 22 of the aperture assembly to satisfy a size requirement, if it is desired to keep the original aperture size, the aperture can be modified to be the afore-described non-circular aperture on the promise that the area of opening is same. That is, the top and bottom sides of a circle are cut out (to obtain the first cut edge 22a and the second cut edge 22b) and curved edges at the left and right sides of the circuit extend horizontally (to obtain the first curved edge 22c and the second curved edge 22d), thereby reducing the impact on the aperture size due to a reduction of the size of the camera.

In the aperture assembly of the present application, the hollow portion 221 of the plate 22 used to define the aperture of the optical lens system has a non-circular contour, and therefore it can prevent the aperture size from being reduced as the size of the plate is reduced in a case that a circular aperture is applied to the plate. The present application can realize a deployment of an image capturing module with a large size of aperture for a thin or small-sized electronic device, thereby realizing photographing with a large aperture.

In addition, the non-circular contour can also be constructed by a plurality of successive concave and convex figures, saws or waves (not shown), that is, the contour has the plurality of concave and convex figures, saws or waves but the whole contour is still a non-circular contour.

Figure 3A:
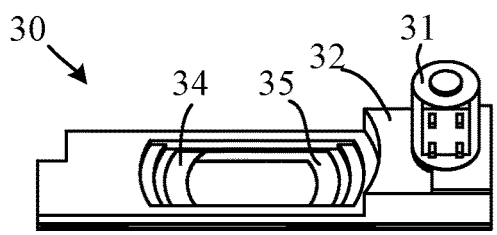
FIG. 3A is a perspective view of an aperture assembly in accordance with a first embodiment of the present application.
Figure 3B:
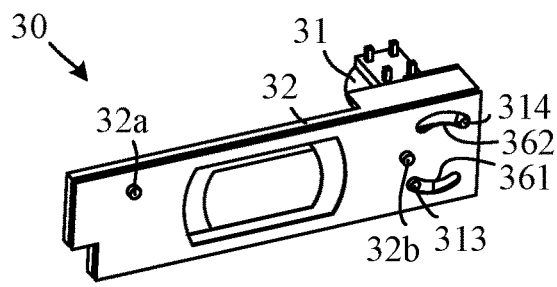
FIG. 3B is a perspective view, at another angle, of the aperture assembly in accordance with the first embodiment of the present application.
Figure 3C:
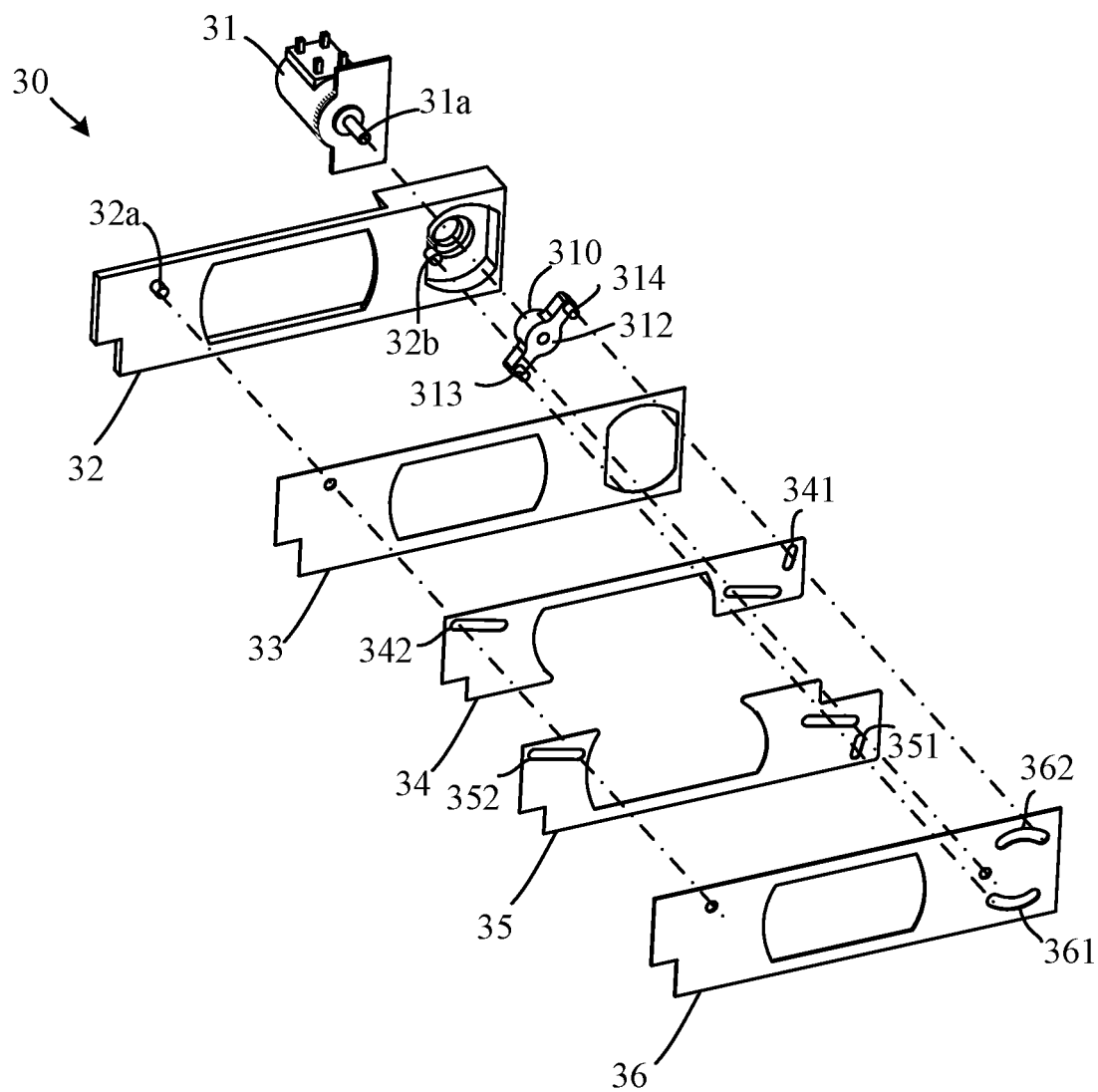
FIG. 3C is an explored view of the aperture assembly in accordance with the first embodiment of the present application.

FIG. 3A to FIG. 3C are diagrams illustrating an aperture assembly 30 in accordance with a first embodiment of the present application. The aperture assembly 30 can adjust the aperture size, making the image capturing module or the camera lens have multiple aperture sizes. FIG. 3A is a perspective view of the aperture assembly 30, FIG. 3B is a perspective view at another angle, and FIG. 3C is an explored view. Referring to FIG. 3A to FIG. 3C, the aperture assembly 30 includes a driving unit (e.g., a motor 31), a base 32, a first flat plate 33, a first aperture sheet 35, a second aperture sheet 34 and a second flat plate 36. The driving unit 31 is fastened to the base 32. The first plate 33, the second aperture sheet 34, the first aperture sheet 35 and the second flat plate 36 are disposed on the base 32. For example, these elements sequentially overlap on the base 32. The first aperture sheet 35 and the second aperture sheet 34 are disposed between the first flat plate 33 and the second flat plate 36. The aperture sheets described herein can be aperture blade, iris shutter, diaphragm, and etc. The first flat plate 33 can also be called as a bottom plate and the second flat plate 36 can also be called as a cover plate. The aforedescribed plate 22 can be any of the base 32, the first flat plate 33 and the second flat plate 36 and can also be a general name of the plates 32, 33 and 36. All the plates 32, 33 and 36 have hollow portions used to define the aperture of the optical lens system. These hollow portions have similar or the same size or shape. As shown in FIG. 3C, all the base 32, the first flat plate 33 and the second flat plate 36 have a non-circular hollow portion having top and bottom cut edges and left and right curved edges.

The driving unit can be a motor driven by electricity, such as the motor 31, but is not limited thereto. The driving unit can be implemented by a magnet-coil assembly driven by a magnetic force, a voice coil motor, and etc., and can also be a driver implemented using piezoelectric material, shape memory alloy (SMA), and etc.

For example, the electrical motor 31 is taken as the driving unit for the illustration below. Referring to FIG. 3A to FIG. 3C, the motor 31 has a rotatable axial rod 31a, and the aperture assembly 30 further includes a rotating member 310. The axial rod 31a of the motor 31 passes through the base 32. The rotating member 310 is fastened to the axial rod 31a of the motor 31. The base 32 is provided with a concave portion. The rotating member 310 can rotate inside the concave portion as the axial rod 31a rotates. The rotating member 310 has a rotation platform 312 and a first force applying member 313 and a second force applying member 314 disposed on the rotation platform 312. Preferably, the first force applying member 313 and the second force applying member 314 are disposed at opposite sides along a radial direction. The first force applying member 313 and the second force applying member 314 of the rotating member 310 are configured to drive the first aperture sheet 35 and the second aperture sheet 34 to move, respectively, thereby changing the aperture size of the optical lens system. The first force applying member 313 and the second force applying member 314 of the rotating member 310 can be structural members in any form. For example, the first force applying member 313 and the second force applying member 314 are a first protrusion and a second protrusion, respectively.

The first aperture sheet 35 is provided with a first force receiving member 315, the first force applying member 313 of the rotating member 310 is adaptive to the first force receiving member 351, and cooperation between the first force applying member 313 and the first force receiving member 351 makes the rotating member 310 be able to apply a force to the first aperture sheet 35. The second aperture sheet 34 is provided with a second force receiving member 341, the second force applying member 314 of the rotating member 310 is adaptive to the second force receiving member 341, and cooperation between the second force applying member 314 and the second force receiving member 341 makes the rotating member 310 be able to apply a force to the second aperture sheet 34. Specifically, the first force receiving member 351 on the first aperture sheet 35 is a first force receiving hole for example and the second force receiving member 341 on the second aperture sheet 34 is a second force receiving hole for example. The first protrusion of the rotating member 310 penetrates the first force receiving hole of the first aperture sheet 35 and the second protrusion of the rotating member 310 penetrates the second force receiving member of the second aperture sheet 34. When the motor 31 rotates, the first protrusion of the rotating member 310 applies a force to the first aperture sheet 35 at the first force receiving hole of the first aperture sheet 35 to make the first aperture sheet 35 move; the second protrusion of the rotating member 310 applies a force to the second aperture sheet 34 at the second force receiving hole of the second aperture sheet 34 to make the second aperture sheet 34 move.

Figure 4A:
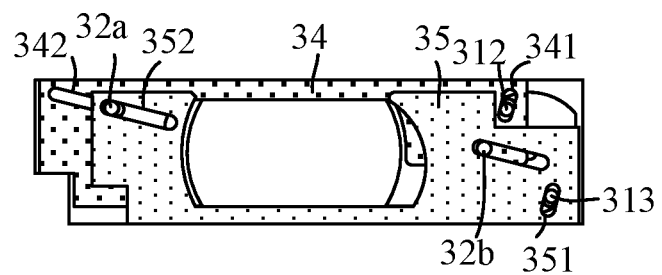
FIG. 4A is a schematic diagram illustrating the movement of a first aperture sheet and a second aperture sheet in accordance with the first embodiment of the present application.
Figure 4B:
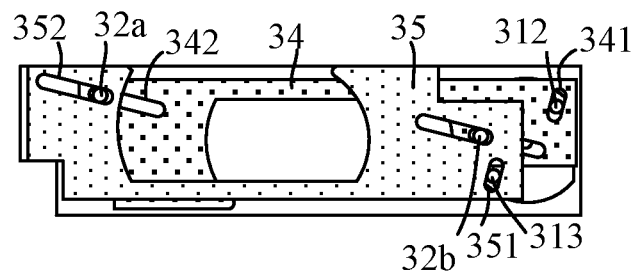
FIG. 4B is a schematic diagram illustrating the movement of a first aperture sheet and a second aperture sheet in accordance with the first embodiment of the present application.

FIG. 4A and FIG. 4B are schematic diagrams illustrating operations of the first aperture sheet 35 and the second aperture sheet 34. Referring to FIG. 4A and FIG. 4B in accompanying with FIG. 3C, when the first aperture sheet 35 moves along a first direction (e.g., toward the upper left) and the second aperture sheet 34 moves along a second direction (e.g., toward the lower right) (e.g., from FIG. 4A to FIG. 4B), the size of the aperture of the optical lens system is changed such that the optical lens system has a first aperture size (e.g., a smaller aperture size); when the first aperture sheet 35 moves along the second direction (e.g., toward the lower right) and the second aperture sheet 34 moves along the first direction (e.g., toward the upper left) (e.g., from FIG. 4B to FIG. 4A), the size of the aperture of the optical lens system is changed such that the optical lens system has a second aperture size (e.g., a larger aperture size). The first aperture size is different from the second aperture size (in this instance, the second aperture size is greater than the first aperture size). In this example, the second aperture size can be as the same as the aperture size defined by the hollow portion 221 of the plate 22 or smaller than the aperture size defined by the hollow portion 221 of the plate 22. Preferably, the first direction and the second direction are opposite directions.

Specifically, referring to FIG. 3C, FIG. 4A and FIG. 4B, in a case that the motor 31 drives the rotating member 310 to rotate clockwise, the first force applying member 313 of the rotating member 310 drives the first aperture sheet 35 to move along the first direction (e.g., toward the upper left) and the second force applying member 314 of the rotating member 310 drives the second aperture sheet 34 to move along the second direction (e.g., toward the lower right), that is, the movement as shown from FIG. 4A to FIG. 4B, and meanwhile, the aperture of the optical lens system is changed from the second aperture size to the first aperture size, which is a first stage of aperture size; in a case that the motor 31 drives the rotating member 310 to rotate counter-clockwise, the first force applying member 313 of the rotating member 310 drives the first aperture sheet 35 to move along the second direction (e.g., toward the lower right) and the second force applying member 314 of the rotating member 310 drives the second aperture sheet 34 to move along the first direction (e.g., toward the upper left), that is, the movement as shown from FIG. 4B to FIG. 4A, and meanwhile, the aperture of the optical lens system is changed from the first aperture size to the second aperture size, which is a second stage of aperture size. As such, multiple-stage adjustment of the aperture of the optical lens system is realized.

Referring to FIG. 3A to FIG. 3C, the base 32 is provided with a position limiting member 32a, and the first aperture sheet 35 has a first position limiting structure 352 and the second aperture sheet 34 has a second position limiting structure 342. The position of the first position limiting structure 352 of the first aperture sheet 35 corresponds to the position of the second position limiting structure 342 of the second aperture sheet 34. The position limiting member 32a of the base 32 is adaptive to the first position limiting structure 352 and the second position limiting structure 342 and is configured to guide the movement of the first aperture sheet 35 and the second aperture sheet 34. Specifically speaking, the position limiting member 32a on the base 32 can be a position limiting protrusion, and the first position limiting structure on the first aperture sheet 35 can be a first position limiting hole and the second position limiting structure 342 on the second aperture sheet 34 can be a second position limiting hole. The position limiting protrusion on the base 32 penetrates the first position limiting hole of the first aperture sheet 35 and the second position limiting hole of the second aperture sheet 34. The first position limiting hole of the first aperture sheet 35 and the second position limiting hole of the second aperture sheet 34 extend along the first direction and the second direction. In such a way, under the guiding carried out by the position limiting protrusion and the first position limiting hole, the first aperture sheet 35 can move along the first direction (e.g., toward the upper left) and can also move along the second direction (e.g., toward the lower right); under the guiding carried out by the position limiting protrusion and the second position limiting hole, the second aperture sheet 34 can move along the first direction (e.g., toward the upper left) and can also move along the second direction (e.g., toward the lower right).

The base 32 may also be provided with another position limiting member 32b, such as a position limiting protrusion. Position limiting structures (e.g., position limiting holes) are additionally arranged on the first aperture sheet 35 and the second aperture sheet 34 at corresponding positions. Two or more than two position limiting structures can make the movement of the first aperture sheet 35 and the second aperture sheet 34 more stable.

Referring to FIG. 3A to FIG. 3C, the second flat plate 36 is provided with a first position limiting slot 361 and a second position limiting slot 362. The first force applying member 313 of the rotating member 310 penetrates the first position limiting slot 361 on the second flat plate 36 and the second force applying member 314 of the rotating member 310 penetrates the second position limiting slot 362 on the second flat plate 36. The shape of the first position limiting slot 361 matches a track of rotation of the first force applying member 313 and the shape of the second position limiting slot 362 matches a track of rotation of the second force applying member 314. That is, the first position limiting slot 361 is shaped as an arc, which corresponds to the motion track of the first force applying member 313, and is configured to restrict the movement of the first force applying member 313 of the rotating member 310; the second position limiting slot 362 is shaped as an arc, which corresponds to the motion track of the second force applying member 314, and is configured to restrict the movement of the second force applying member 314 of the rotating member 310. The sizes of the first position limiting slot 361 and the second position limiting slot 362 decides a range of radians that the rotating member 310 can rotate at, thereby limiting an amount of movement of the first aperture sheet 35 and the second aperture sheet 34.

It is to be noted that the position limiting slot 361 and the second position limiting slot 362 can also be disposed on another plate in addition to the second flat plate 36, and this can be modified based on the needs of structural designs.

The afore-described first direction and second direction are inclined with respect to the first cut edge 22a or the second cut edge 22b, that is, they are inclined directions. The first aperture sheet 35 and the second aperture sheet 34 moves toward the upper left and/or the lower right. However, in an embodiment, the first direction and the second direction can also be directions parallel to the first cut edge 22a or the second cut edge 22b, that is, they are horizontal directions. In this way, the first aperture sheet 35 and the second aperture sheet 34 can move toward the left and/or the right. In another embodiment, the first direction and the second direction can also be directions perpendicular to the first cut edge 22a or the second cut edge 22b, that is, they are vertical directions. In this way, the first aperture sheet 35 and the second aperture sheet 34 can move toward the top and/or the bottom. Various implementations can be accomplished by making some appropriate adjustments on the force applying members on the rotating member 310, the force receiving members and position limiting structures on the aperture sheets, the position limiting members on the base 32 and/or the position limiting slots on the plate.

Figure 5:
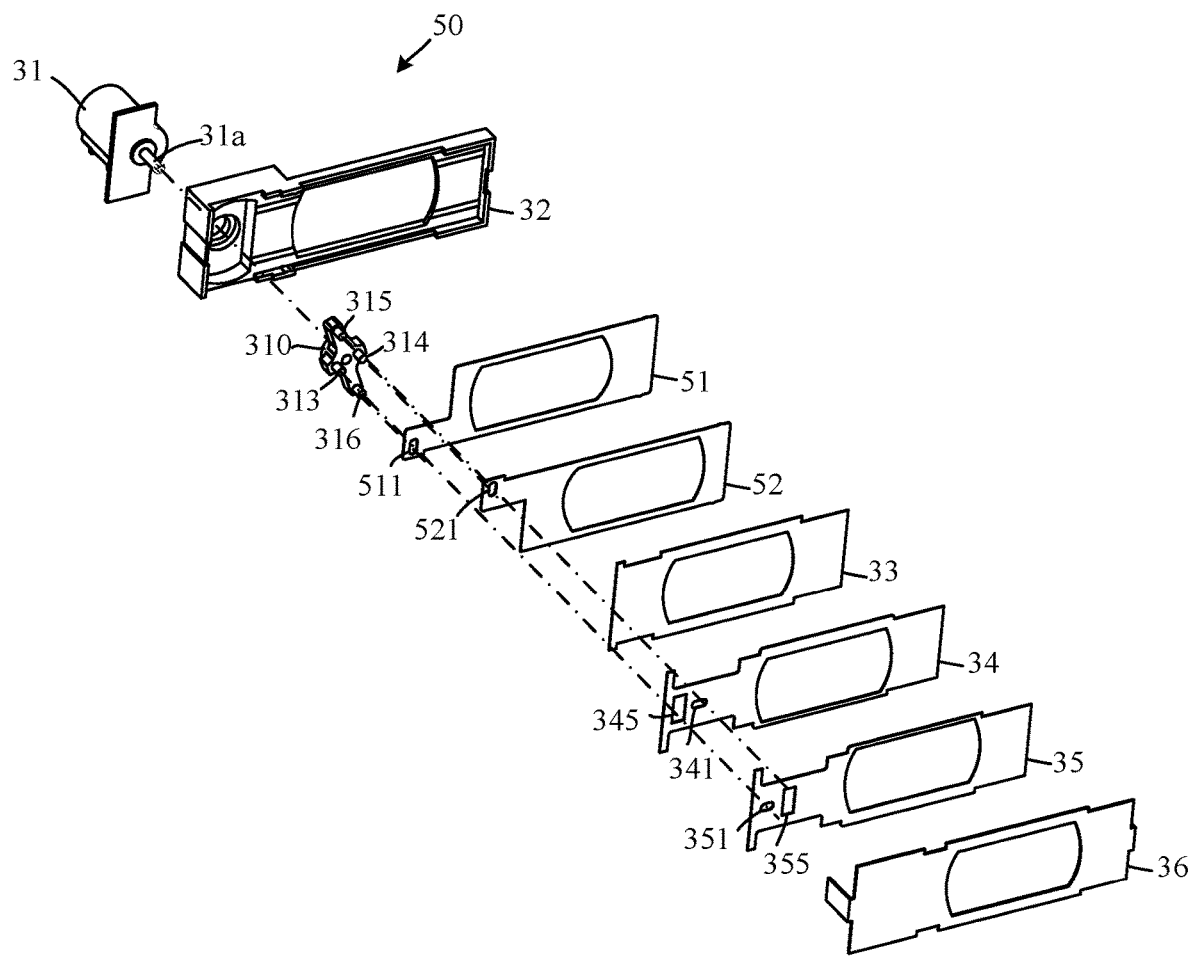
FIG. 5 is an explored view of an aperture assembly in accordance with a second embodiment of the present application.

FIG. 5 is a diagram illustrating an aperture assembly 50 in accordance with a second embodiment of the present application. The aperture assembly 50 has two pairs of aperture sheets, that is, four aperture sheets. One of the two pairs of aperture sheets realizes the movement along vertical directions and the other one of the two pairs of aperture sheets realizes the movement along horizontal directions. Therefore, multiple-stage aperture adjustment can be achieved. As shown in FIG. 5, the first aperture sheet 35 and the second aperture sheet 34 overlap between the bottom plate and the cover plate and can move along vertical directions; the third aperture sheet 52 and the fourth aperture sheet 51 overlap between the base 32 and the bottom plate and can move along horizontal directions.

Figure 6A:
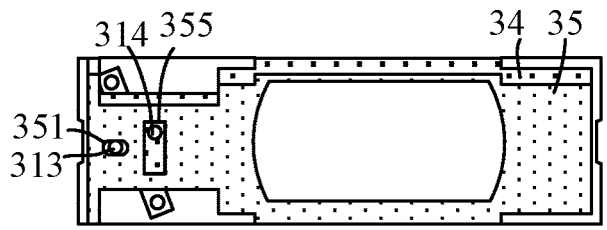
FIG. 6A is a schematic diagram illustrating the movement of a first aperture sheet and a second aperture sheet in accordance with the second embodiment of the present application.
Figure 6B:
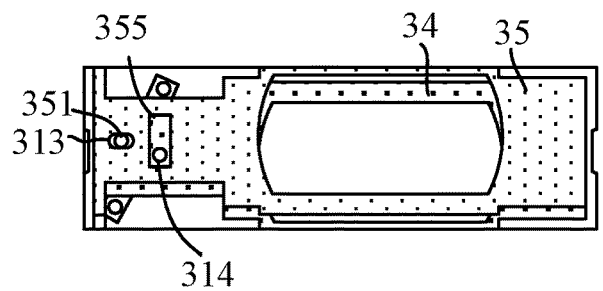
FIG. 6B is a schematic diagram illustrating the movement of a first aperture sheet and a second aperture sheet in accordance with the second embodiment of the present application.

As shown in FIG. 5, FIG. 6A and FIG. 6B, when the rotating member 310 rotates clockwise, the first force applying member 313 on the rotating member 310 applies a force to the first aperture sheet 35 at the first force receiving member 351 provided on the first aperture sheet 35 to make the first aperture sheet 35 move upward; the second force applying member 314 on the rotating member 310 applies a force to the second aperture sheet 34 at the second force receiving member 341 provided on the second aperture sheet 34 to make the second aperture sheet 34 move downward, that is, the movement from FIG. 6A to FIG. 6B. When the rotating member 310 rotates counterclockwise, the first force applying member 313 on the rotating member 310 makes the first aperture sheet 35 move downward and the second force applying member 341 on the rotating member 310 makes the second aperture sheet 34 move upward, that is, the movement from FIG. 6B to FIG. 6A. By this way, with the movement along vertical directions, the aperture size of the optical lens system is changed.

Figure 6C:
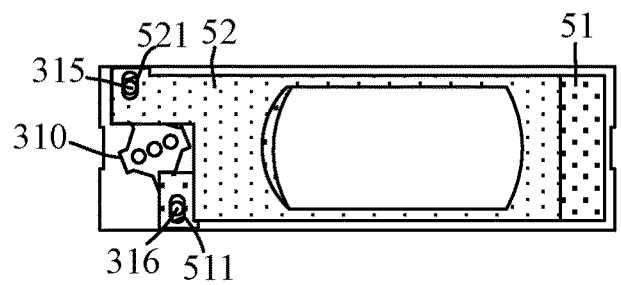
FIG. 6C is a schematic diagram illustrating the movement of a third aperture sheet and a fourth aperture sheet in accordance with the second embodiment of the present application.
Figure 6D:
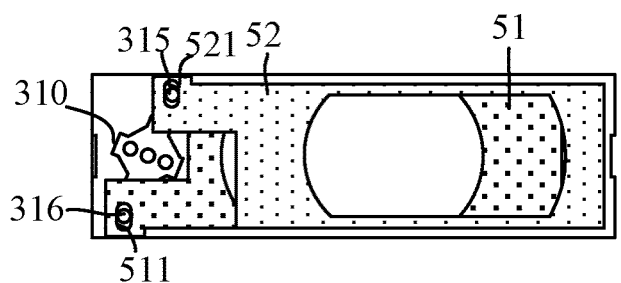
FIG. 6D is a schematic diagram illustrating the movement of a third aperture sheet and a fourth aperture sheet in accordance with the second embodiment of the present application.

As shown in FIG. 5, FIG. 6C and FIG. 6D, the third aperture sheet 52 and the fourth aperture sheet 51 are allowed to move along a third direction (e.g., toward the left) and a fourth direction (e.g., toward the right), respectively, and the third aperture sheet 52 and the fourth aperture sheet 51 are also allowed to move along the fourth direction and the third direction, respectively. Preferably, the third direction and the fourth direction are opposite directions. The rotation platform 312 of the rotating member 310 is provided with a third force applying member 315 and a fourth force applying member 316. Preferably, the third force applying member 315 and the fourth force applying member 316 are disposed at opposite sides along a radial direction. The third aperture sheet 52 is provided with a third force receiving member 521, the third force applying member 315 of the rotating member 310 is adaptive to the third force receiving member 521; the fourth aperture sheet 51 is provided with a fourth force receiving member 511, the fourth force applying member 316 of the rotating member 310 is adaptive to the fourth force receiving member 511. When the rotating member 310 rotates clockwise, the third force applying member 315 on the rotating member 310 applies a force to the third aperture sheet 52 at the third force receiving member 521 provided on the third aperture sheet 52 to make the third aperture sheet 52 move toward the right; the fourth force applying member 316 on the rotating member 310 applies a force to the fourth aperture sheet 51 at the fourth force receiving member 511 provided on the fourth aperture sheet 51 to make the fourth aperture sheet 51 move toward the left, that is, the movement from FIG. 6C to FIG. 6D. When the rotating member 310 rotates counterclockwise, the third force applying member 315 on the rotating member 310 makes the third aperture sheet 52 move toward the left and the fourth force applying member 316 on the rotating member 310 makes the fourth aperture sheet 51 move toward the right, that is, the movement from FIG. 6D to FIG. 6C. By this way, with the movement along horizontal directions, the aperture size of the optical lens system is changed. Preferably, the third force applying member 315 and the fourth force applying member 316 on the rotation platform 312 are a third protrusion and a fourth protrusion, respectively. The third force receiving member 521 on the third aperture sheet 52 and the fourth force receiving member 511 on the fourth aperture sheet 51 are a third force receiving hole and a fourth force receiving hole, respectively. The third protrusion on the rotation platform 312 penetrates the third force receiving hole of the third aperture sheet 52 so as to drive the third aperture sheet 52 to move; the fourth protrusion on the rotation platform 312 penetrates the fourth force receiving hole of the fourth aperture sheet 51 so as to drive the fourth aperture sheet 51 to move.

Therefore, multiple-stage aperture adjustment of the optical lens system can be accomplished as long as an appropriate mechanism is incorporated such that any of the first pair of aperture sheets and the second pair of aperture sheets is activated and the other pair is deactivated, both the first pair of aperture sheets and the second pair of aperture sheets are activated, or are deactivated.

In addition, in an embodiment, as shown in FIG. 5, the first force receiving member 351 of the first aperture sheet 35 and the second force receiving member 341 of the second aperture sheet 34 are a first force receiving hole and a second force receiving hole, respectively, and the first aperture sheet 35 is provided with a first pass allowing hole 355 and the second aperture sheet 34 is provided with a second pass allowing hole 345. The second force applying member 310 of the rotating member 314 penetrates the first pass allowing hole 355 of the first aperture sheet 35 and the second force receiving hole of the second aperture sheet 34. The first pass allowing hole 355 is configured to accommodate the motion track of the second force applying member 314 such that the second force applying member 314 will not interfere with the first aperture sheet 35, when the second force applying member 314 of the rotating member 310 applies a force to the second aperture sheet 34. The first force applying member 313 of the rotating member 310 penetrates the first force receiving hole of the first aperture sheet 35 and the second pass allowing hole 345 of the second aperture sheet 34. The second pass allowing hole 345 is configured to accommodate the motion track of the first force applying member 313 such that the first force applying member 313 will not interfere with the second aperture sheet 34, when the first force applying member 313 of the rotating member 310 applies a force to the first aperture sheet 35.

Figure 7A:
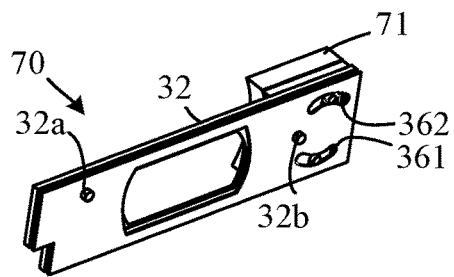
FIG. 7A is a perspective view of an aperture assembly in accordance with a third embodiment of the present application.
Figure 7B:
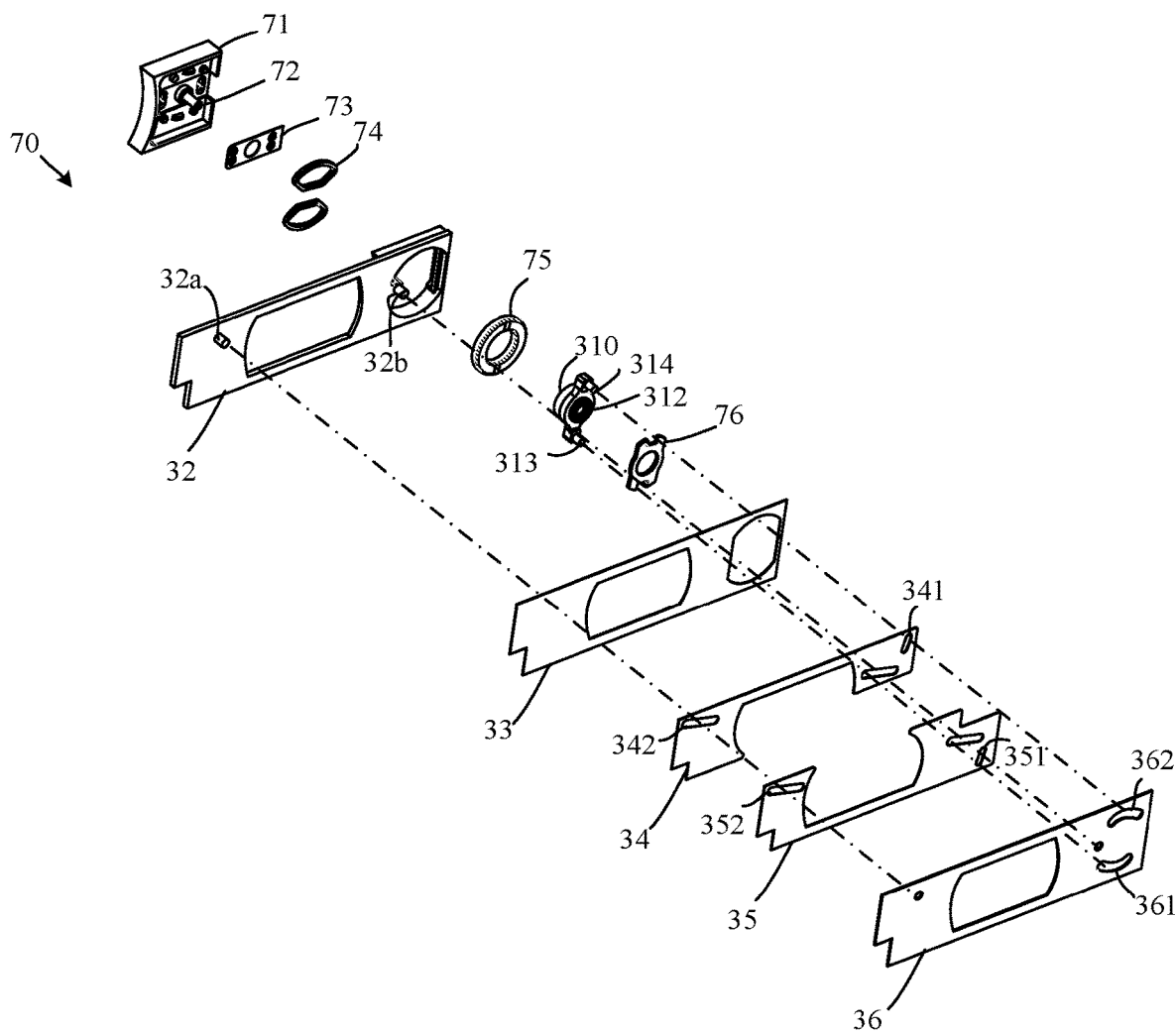
FIG. 7B is an explored view of the aperture assembly in accordance with the third embodiment of the present application.

FIG. 7A is a perspective view of an aperture assembly 70 in accordance with a third embodiment of the present embodiment. FIG. 7B is an explored view of the aperture assembly 70 in accordance with the third embodiment of the present application. Different from the afore-described first embodiment and second embodiment, in the third embodiment a different solution of the driving unit is utilized. In this solution, a magnet and two coils are disposed opposite to each other (e.g., disposed in parallel to each other), thereby greatly reducing the thickness of the aperture assembly. As shown in FIG. 7A and FIG. 7B, the driving unit includes a drive base 71, an axial rod 72, a circuit board 73, a coil assembly 74 (e.g., including two coils), and a magnet 75. The axial rod 72 is disposed on the drive base 71. The circuit board 73 is provided with a hole corresponding to the axial rod 72 for the axial rod 72 to pass through such that the axial rod 72 is connected with the rotating member 310. The rotating member 310 is fastened to the axial rod 72. The circuit board 73 is used to control an electric current flowing through the coil assembly 74. The magnet 75 can be a permanent magnet. The magnet 75 cooperates with the coil assembly 74 to carry out the driving. The magnet 75 and the coil assembly 74 are disposed opposite to each other (e.g., disposed in parallel to each other) such that the driving unit is reduced in thickness, thereby reducing the overall thickness of the aperture assembly. In addition, the cover plate 76 covers the rotating member 310 for providing a protection.

The present application further provides an image capturing module, which includes the afore-described aperture assembly. Detailed descriptions on the aperture assembly are referred to above context, and are not repeated herein.

In the aperture assembly of the present application, a pair of aperture sheets are utilized. One aperture sheet moves along a first direction and the other one aperture sheet moves along a second direction. By this way, the aperture size is changed, and aperture size adjustment for a non-circular aperture is realized. Moreover, a plurality of pairs of aperture sheets can be combined. Each pair of aperture sheets move along a different direction. Multiple-stage aperture adjustment is realized such that the optical lens system has a multiple-stage adjustable aperture.

While the preferred embodiments of the present application have been illustrated and described in detail, various modifications and alterations can be made by persons skilled in this art. The embodiment of the present application is therefore described in an illustrative but not restrictive sense. It is intended that the present application should not be limited to the particular forms as illustrated, and that all modifications and alterations which maintain the spirit and realm of the present application are within the scope as defined in the appended claims.

What is claimed is:

1. An aperture assembly, used in an optical lens system, the aperture assembly comprising:
    a plate, comprising a hollow portion and a non-hollow portion, wherein the hollow portion is configured to define an aperture of the optical lens system, and a contour of the hollow portion has a non-circular shape;
    a first aperture sheet and a second aperture sheet, disposed on the plate, wherein when the first aperture sheet moves along a first direction and the second aperture sheet moves along a second direction, the aperture of the optical lens system is changed such that the optical lens system has a first aperture; when the first aperture sheet moves along the second direction and the second aperture sheet moves along the first direction, the aperture of the optical lens system is changed such that the optical lens system has a second aperture, and wherein the first aperture is different from the second aperture; and
    a rotating member, provided with a first force applying member and a second force applying member, wherein the first aperture sheet is provided with a first force receiving member, the first force applying member of the rotating member is adaptive to the first force receiving member;
    wherein the second aperture sheet is provided with a second force receiving member, the second force applying member of the rotating member is adaptive to the second force receiving member; and
    wherein the first force receiving member of the first aperture sheet and the second force receiving member of the second aperture sheet are a first force receiving hole and a second force receiving hole, respectively, the first aperture sheet is provided with a first pass allowing hole, the second aperture sheet is provided with a second pass allowing hole, the first force applying member of the rotating member penetrates the first force receiving hole of the first aperture sheet and the second pass allowing hole of the second aperture sheet, the second force applying member of the rotating member penetrates the first pass allowing hole of the first aperture sheet and the second force receiving hole of the second aperture sheet.

2. The aperture assembly according to claim 1, wherein the contour of the hollow portion comprises a first cut edge and a first curved edge connected to the first cut edge, and a second cut edge and a second curved edge connected to the second cut edge, and wherein the second cut edge is disposed opposite to the first cut edge and the second curved edge is disposed opposite to the first curved edge.

3. The aperture assembly according to claim 2, wherein the first cut edge and the second cut edge have an approximately same length and the first curved edge and the second curved edge have a same radius of curvature.

4. The aperture assembly according to claim 2, wherein the first direction and the second direction are inclined with respect to, parallel to or perpendicular to the direction of the first cut edge or the second cut edge.

5. The aperture assembly according to claim 1, wherein the first force applying member applies a force to the first aperture sheet as the rotating member rotates such that the first aperture sheet moves, and wherein the second force applying member applies a force to the second aperture sheet as the rotating member rotates such that the second aperture sheet moves.

6. The aperture assembly according to claim 1, further comprising:
    a base, provided with a position limiting member, wherein the first aperture sheet has a first position limiting structure, the second aperture sheet has a second position limiting structure, the position limiting member of the base is adaptive to the first position limiting structure and the second position limiting structure and is configured to guide the movement of the first aperture sheet and the second aperture sheet.

7. The aperture assembly according to claim 6, the first force applying member and the second force applying member of the rotating member are located at radial opposite positions, and the first position limiting structure of the first aperture sheet and the second position limiting structure of the second aperture sheet extend along the first direction and the second direction.

8. The aperture assembly according to claim 6, wherein the plate is provided with a first position limiting slot and a second position limiting slot, the first force applying member of the rotating member penetrates the first position limiting slot on the plate, and the second force applying member of the rotating member penetrates the second position limiting slot on the plate, and wherein the first position limiting slot is configured to limit the movement of the first force applying member of the rotating member; the second position limiting slot is configured to limit the movement of the second force applying member of the rotating member.

9. The aperture assembly according to claim 8, wherein the first position limiting slot is shaped as an arc and corresponds to a motion track of the first force applying member, and the second position limiting slot is shaped as an arc and corresponds to a motion track of the second force applying member.

10. The aperture assembly according to claim 6, wherein the first force applying member and the second force applying member of the rotating member are a first protrusion and a second protrusion, respectively, the first force receiving member on the first aperture sheet and the second force receiving member on the second aperture sheet are a first force receiving hole and a second force receiving hole, respectively, the first protrusion of the rotating member penetrates the first force receiving hole of the first aperture sheet, and the second protrusion of the rotating member penetrates the second force receiving hole of the second aperture sheet.

11. The aperture assembly according to claim 10, wherein the position limiting member on the base is a position limiting protrusion, the first position limiting structure of the first aperture sheet and the second position limiting structure of the second aperture sheet are a first position limiting hole and a second position limiting hole, respectively, and the position limiting protrusion penetrates the first position limiting hole of the first aperture sheet and the second position limiting hole of the second aperture sheet, and wherein the first aperture sheet and the second aperture sheet are aperture blades that sequentially overlap on the plate.

12. The aperture assembly according to claim 1, wherein the first pass allowing hole is configured for the second force applying member of the rotating member not to interfere with the first aperture sheet when applying a force to the second aperture sheet, and the second pass allowing hole is configured for the first force applying member of the rotating member not to interfere with the second aperture sheet when applying a force to the first aperture sheet.

13. The aperture assembly according to claim 1, further comprising a third aperture sheet and a fourth aperture sheet, overlapping with the plate, the first aperture sheet and the second aperture sheet, wherein the third aperture sheet and the fourth aperture sheet are allowed to move along a third direction and a fourth direction, respectively, and the third aperture sheet and the fourth aperture sheet are also allowed to move along the fourth direction and the third direction, respectively.

14. The aperture assembly according to claim 13, wherein the rotating member further comprises:
   a third force applying member and a fourth force applying member; and
   wherein the first force applying member drives the first aperture sheet to move along the first direction; wherein the second force applying member drives the second aperture sheet to move along the second direction; the third aperture sheet is provided with a third force receiving member, the third force applying member of the rotating member is adaptive to the third force receiving member, and the third force applying member drives the third aperture sheet to move along the third direction; the fourth aperture sheet is provided with a fourth force receiving member, the fourth force applying member of the rotating member is adaptive to the fourth force receiving member, and the fourth force applying member drives the fourth aperture sheet to move along the fourth direction.

15. The aperture assembly according to claim 14, wherein the first direction and the second direction corresponds to vertical directions, and the third direction and the fourth direction corresponds to horizontal directions.

16. The aperture assembly according to claim 6, further comprising:
   a driving unit, which is a motor having a rotatable axial rod, wherein the rotating member is fastened to the axial rod of the motor and rotates as the axial rod rotates.

17. The aperture assembly according to claim 6, further comprising:
   a driving unit, comprising a drive base, an axial rod, a magnet and a coil, wherein the magnet is disposed opposite to the coil, the axial rod is disposed on the drive base, and the rotating member is connected to the axial rod.

18. The aperture assembly according to claim 1, wherein the hollow portion of the plate used to define the aperture of the optical lens system has a non-circular contour, and the non-circular contour is constructed by a plurality of successive concave and convex figures, saws or waves.

19. The aperture assembly according to claim 18, wherein the non-circular contour has the plurality of concave and convex figures, saws or waves but the whole contour is still a non-circular contour.

* * * * *